US012645957B2

(12) United States Patent     (10) Patent No.:   US 12,645,957 B2

De Silva et al.     (45) Date of Patent:    Jun. 2, 2026

(54) COURSE CONTENT DATA ANALYSIS AND PREDICTION

(71) Applicant: Pearson Education, Inc., Bloomington, MN (US)

(72) Inventors: Dinesh De Silva, Colombo (LK); Irfan Fuard, Colombo (LK); Madushika Wijethunga, Kadawatha (LK); Vinothan Nadarajah, Wattala (LK)

(73) Assignee: PEARSON EDUCATION, INC., Bloomington, MN (US)

( * ) Notice: Subject to any disclaimer, the term of this patent is extended or adjusted under 35 U.S.C. 154(b) by 1200 days.

(21) Appl. No.: 17/314,529

(22) Filed: May 7, 2021

(65) Prior Publication Data

US 2022/0358376 A1     Nov. 10, 2022

(51) Int. Cl.
| | |
|---|---|
| *G06N 5/04* | (2023.01) |
| *G06F 3/14* | (2006.01) |
| *G06N 20/00* | (2019.01) |
| *G06Q 10/10* | (2023.01) |
| *G06Q 30/0201* | (2023.01) |
| *G06Q 50/20* | (2012.01) |

(52) U.S. Cl.
CPC ................ *G06N 5/04* (2013.01); *G06F 3/14* (2013.01); *G06N 20/00* (2019.01); *G06Q 10/10* (2013.01); *G06Q 30/0201* (2013.01); *G06Q 50/205* (2013.01)

(58) Field of Classification Search
CPC . G06N 5/04; G06N 20/00; G06F 3/14; G06Q 10/10; G06Q 30/0201; G06Q 50/205; G09G 2358/00; G09G 2370/022; G09G 2370/025
See application file for complete search history.

(56) References Cited

U.S. PATENT DOCUMENTS

| | | | | |
|---|---|---|---|---|
| 2016/0063881 A1* | 3/2016 | Brinton | .................... | G09B 5/02 |
| | | | | 434/353 |
| 2016/0147891 A1* | 5/2016 | Chhichhia | ............. | G06F 16/986 |
| | | | | 707/734 |
| 2016/0314699 A1* | 10/2016 | Brinton | .................... | G09B 7/00 |
| 2019/0347668 A1* | 11/2019 | Williams | ................ | G06F 18/23 |

OTHER PUBLICATIONS

M. Xiao and J. Hou, "Model-Driven Approach for Agent Based Software System," 2010 2nd International Workshop on Database Technology and Applications, Wuhan, China, 2010, pp. 1-4, (Year: 2010).*

* cited by examiner

*Primary Examiner* — Daniel T Pellett

(74) *Attorney, Agent, or Firm* — Quarles & Brady LLP

(57) ABSTRACT

Systems and methods of the present invention provide for receiving, from a content activity agent on a first client device, a content usage data; input, into a machine learning model, at least one content activity parameter, translated from the content usage data; generating, using an output from the machine learning model, a graphical user interface (GUI), displayed on a second client device, and including a report of: the output, a recommendation for an update to a course content, and a prediction of an increase to an average assessment score associated with the course content if the updated content is used.

20 Claims, 9 Drawing Sheets

100

200

COURSE CONTENT DATA ANALYSIS AND PREDICTION

FIELD OF THE INVENTION

This disclosure relates to the field of systems and methods configured to receive a plurality of user behavior data relating to a structure of a course content, analyze the data to determine assessment score data and user interaction time data, input the user behavior data into a machine learning model, and generate reports, predictions, and/or recommendations for improving user performance for the course content.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to: receive, from a content activity agent on a first client device, a content usage data; input, into a machine learning model, at least one content activity parameter, translated from the content usage data; generate, using an output from the machine learning model, a graphical user interface (GUI), displayed on a second client device, and including a report of: the output, a recommendation for an update to a course content, and a prediction of an increase to an average assessment score associated with the course content if the updated content is used.

The above features and advantages of the present invention will be better understood from the following detailed description taken in conjunction with the accompanying drawings.

DETAILED DESCRIPTION

Figure 1:
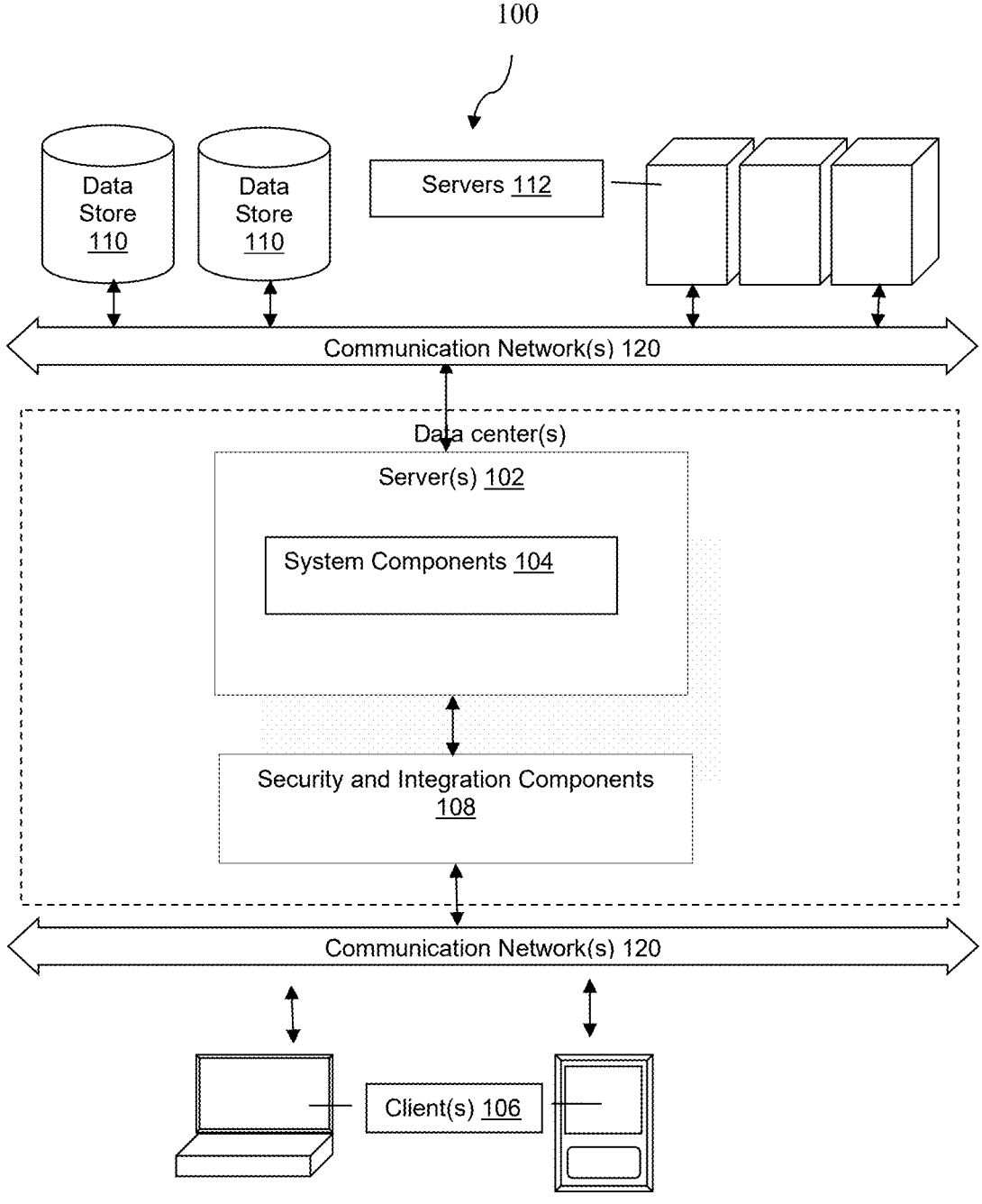
FIG. 1 illustrates a system level block diagram for analyzing course content data, and generating reports, predictions, and/or recommendations for a course content.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

When learners (e.g., college students) attends a learning course, it may be assumed that their ultimate goal is to achieve the highest possible grade for the learning course. Similarly, a course content creator (e.g., a professor at a university) also presumably wants the highest possible grades for their learners.

Many institutions or entities, such as universities, provide course content creators with course creation tools for learning courses. (e.g., Pearson Education's MEMPHIS). These course creation tools often allow a course content creator to access a software running on a client device to select from one or more content creation structures (e.g., content templates, components, modules, formats, layouts, etc.), which learning stakeholders, such as universities, professors, administrators, course content creators, and the like, use to generate the course content.

However, current course content creation tools only allow for the creation of course content (e.g., by creating course content from scratch, cloning the content for an existing "master" course, generating a class from existing content creation structures, etc.). After learners access the content created by such course content creation tools, current course creation tools are unable to recognize user behavioral patterns from the selected content structure within specific learning courses, and therefore do not provide the course content creators, or future course content creators, with the results of the learners' performance in the use of such content structures. They are therefore unable to predict the success of any given content structure when used in the future and have no guidance regarding which content structures are the most effective.

Current content creation tools are therefore unable to determine and recommend future course content. Furthermore, even if such information was available via current course content creation tools, content creators for the learning courses would have no way of accessing, viewing, or otherwise determining how learners performed using a particular content structure, in order to determine an optimal template or template component to use in future learning courses. In short, when a course content creator creates and delivers course content to be presented to learners, they lack sufficient content usage data and resources to determine which course content structure should be included within an existing learning course, or in future courses, or to recommend the content for future courses in order to optimize learner performance within the learning course in order to create the highest possible results.

To overcome the discrepancies in the prior art, the disclosed embodiments observe student behaviors when interacting with elements and structures of learning course content for a learning course, then collect and analyze the data associated with such user interactions and behaviors.

This analyzed data is then converted into parameters to be input into a machine learning model in order to execute a machine learning algorithm, which processes the information in light of training data provided, and outputs data allowing for better content design practices, resulting in a better customer (e.g., content creator, instructor, and/or student) experience.

This output may then be used by content authors to: 1. Predict and design courses that can result in higher student performance in the course (e.g., higher "Check Your Understanding, or CYU, results) and ultimately higher final grades for the course; 2. View detailed data of the exiting course usage data; 3. Predict and recommend future content templates, which may not currently be available, and should be added to available templates for learning courses, which will result in higher performance results for the learners; and 4. Provide recommendations to content authors for a better content design experience that will result in comparatively higher grades.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120.

Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
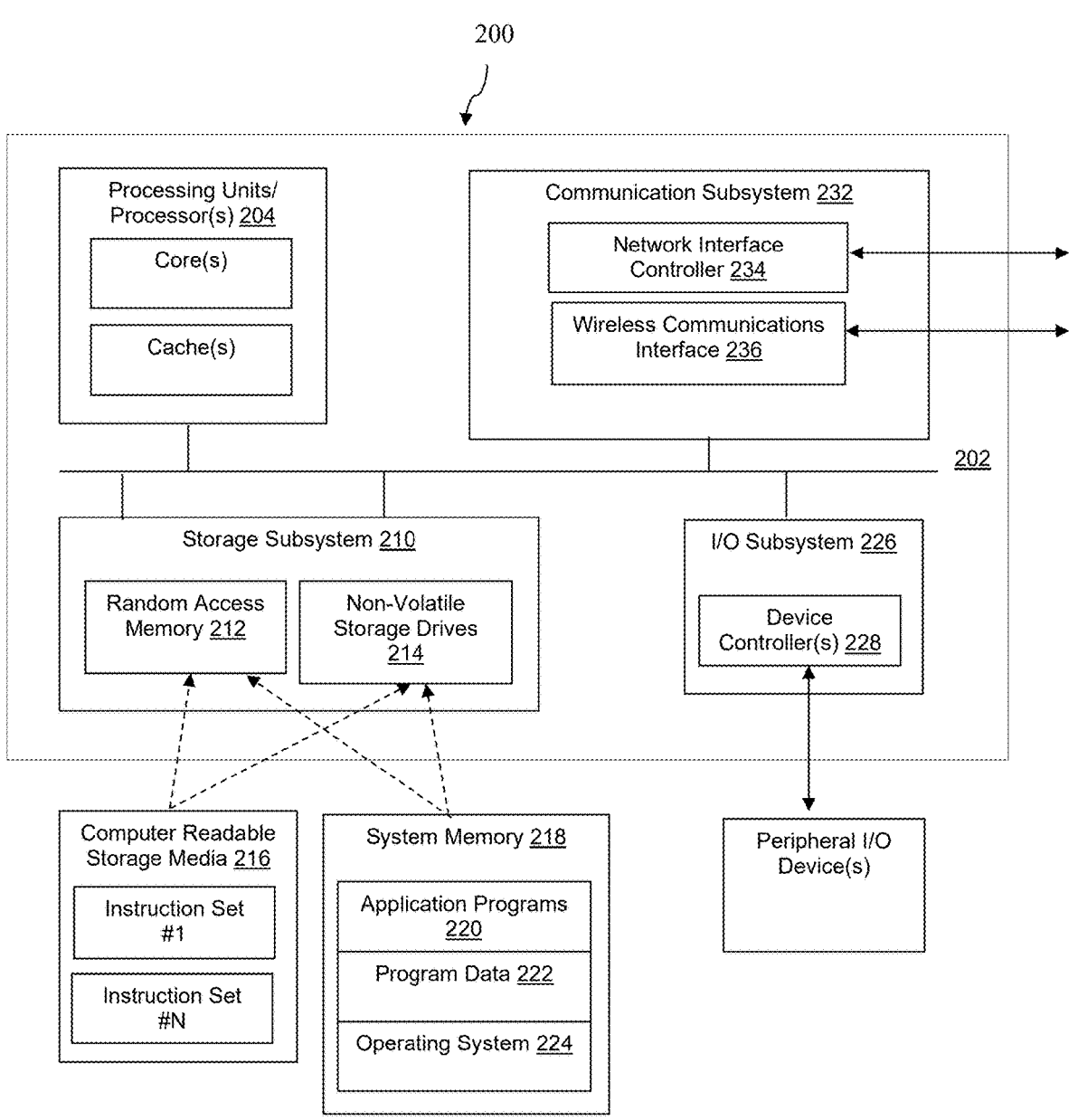
FIG. 2 illustrates a system level block diagram for analyzing course content data, and generating reports, predictions, and/or recommendations for a course content.
Figure 3:
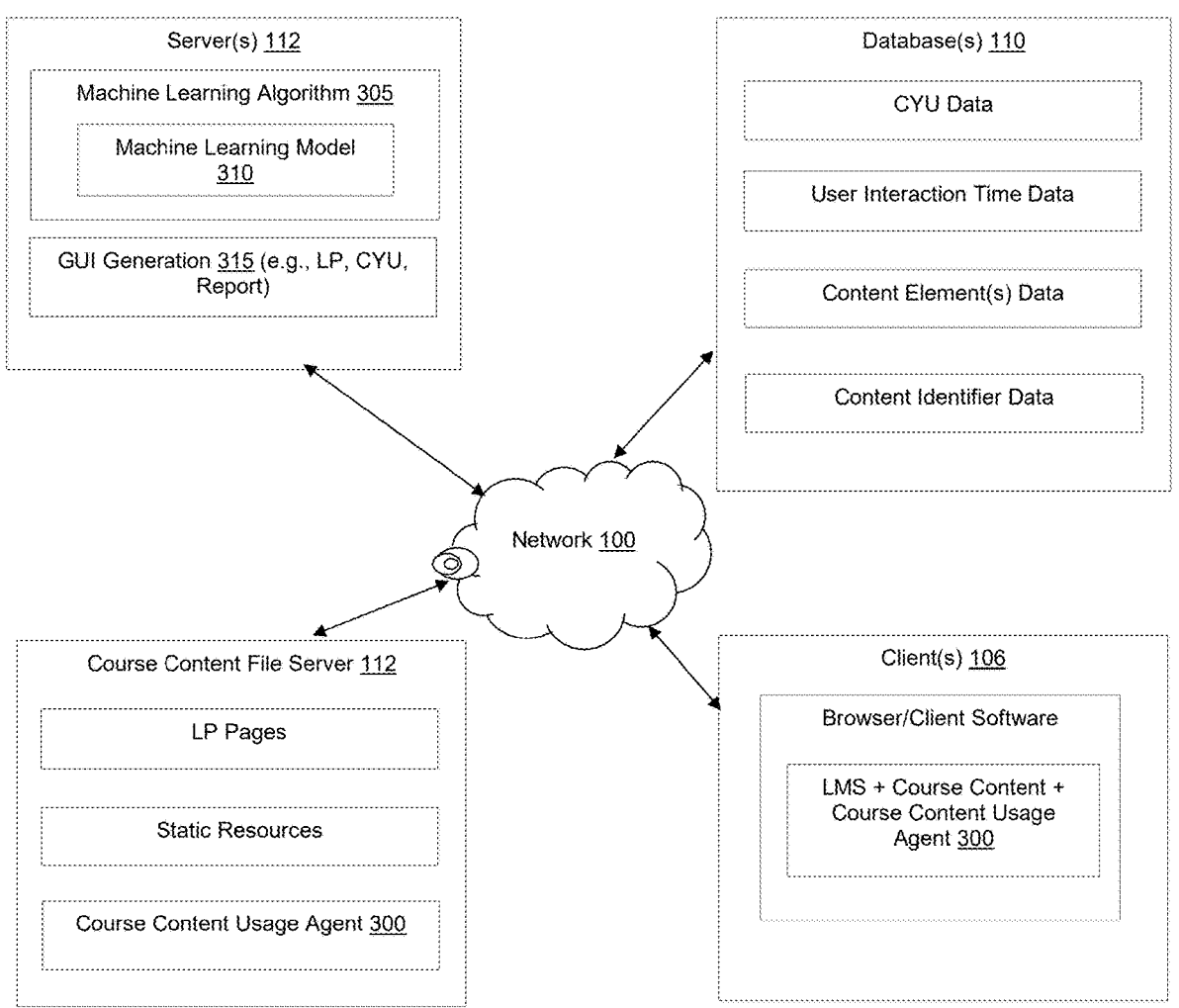
FIG. 3 illustrates a system level block diagram for analyzing course content data, and generating reports, predictions, and/or recommendations for a course content.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser-based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information, and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally, and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

As noted above, the disclosed embodiments observe student behaviors when interacting with elements and structures of learning course content for a learning course, then collect and analyze the data associated with such user interactions and behaviors. This analyzed data is then converted into parameters for a machine learning model/algorithm, which processes the information in light of training data provided, and outputs data allowing for better content design practices, resulting in a better customer (e.g., content creator, instructor, and/or learner) experiences.

In the disclosed embodiments course content creators, may be provided access to improved and more efficient course creation tools via a learning management system (LMS), however, although course creation tools may be available within the LMS to a certain extent, not all course creation tools disclosed herein are found in the LMS. As a non-limiting example, external authoring tools may also be utilized to create course content, and these or the content generated from them may be made available through the LMS. In some disclosed embodiments the disclosed LMS may allow a content creator to select a most effective course content structure (e.g., content templates, components, modules, formats, layouts, rubrics, blueprints, media types associated with the educational content, etc.) that provide students with the highest potential grades.

In the disclosed embodiments, learning institutions (e.g., universities) may provide instructors or other course content creators with an LMS that includes one or more authoring or other support tools in order to create course content. Additionally, LMS can support course authoring for a certain level. LMS can show course content authored by other authoring tools like Pearson Education's MEMPHIS. In this context, the content created from a course authoring tool such as MEMPHIS, are shown in the LMS. Learners may also use the LMS to access learner support tools, which may be used to access assignments, assessments, various text or multimedia content, etc. in order to progress through the learning course.

For each course, a course blueprint, including course foundation material (CFM), may be provided, which may include required curriculum or the platform for learning course content that the instructors need to teach. Non-limiting examples of such CFM may include a "master" course content for each course offered by the institution, which may include a foundation content for the course.

In some embodiments, the CFM may be broken down, for each course, into a series of topics, each of which may have a sequence of LP pages, disclosed below. Each lesson may further include subjects, and/or learning modules. Each of the topics may further include a collection of learning presentation (LP) pages, each including one or more elements that make up the LP page. Each topic may therefore be made up of a sequence of LP pages. As a non-limiting example, each of these LP pages may be an HTML page made up of text, multi-media content (e.g., images or video links), external links, and/or other external content.

In some embodiments, the CFM may be organized into a uniform learning flow. As a non-limiting example, in some embodiments, each topic in a learning course may be organized into a learning flow including an introduction, one or more LP pages, one or more CYU pages or quizzes, and a summary/review for all previously presented material.

The introduction may include the introductory details for the topic. The LP pages may include the presentation layer— the main educational content and structure by which students view the course contents, and each of these pages may include content, such as text, multi-media presentation (e.g., images, video content, other media types, etc.) of the educational content, external links, links to external content, and the like to deliver the presentation to the learners. The CYU pages may be assessments within the learning flow that evaluate the level of understanding of the content by the students. The review pages may provide a summary on the content delivered by the topic.

In some embodiments, the institution may create and provide, through the course authoring tool, templates for each topic within a learning course that reflects the learning flow described above. As a non-limiting example, the institution may provide a certain number of LP templates and a certain number of CYU templates. The course content creator may then select from among these templates to create their course and determine how the course content will be presented to the learners in the course. In some embodiments, the course content creator may select from templates for the course, templates for each topic, templates for each LP page, templates for each content element in each learning page, templates for each CYU page, and the like.

The instructor or other content creator may then access the authoring tool, or any other available course content creation tools, and design their course according to a content structure that they are confident will provide the best results.

Thus, when an instructor or other course content creator creates a course, the course creator may choose the course content to be presented to the learners through the learning course. This may be accomplished by the course creator by selecting and cloning a master course through the LMS, the course authoring tool, or MEMPHIS, and creating a copy of that master course. Alternatively, the course creator may select and edit the master course CFM and LP pages based on the content that they plan to present to the learners. Finally, if a course creator is creating the course from scratch, the course creator may create a blueprint of the CFM and the content for each LP page for the course, possibly, using the templates or other available editable content at a course, topic, page, or element level, and arranging the content structure in a customized manner.

Once the content of each learning course has been completed by the course content creator, the disclosed system may be configured to capture course usage data, transmit the captured and collected course usage data to server 112, which may execute an evaluation and prediction engine comprising a machine learning model/algorithm, which outputs the evaluation, predictions of the most efficient templates, and recommended template usage for the most effective results.

This may be implemented in two phases: First, the LP pages may include, or may associated with, one or more software modules in the LMS making up one or more course content usage agents 300, described in more detail below, which may by execute in a browser, and may asynchronously collect usage data and/or consumption data and transmit the collected data through server 112, to database 110. The server 112 may then execute the machine learning algorithm 305 (e.g., a regression method) using the machine learning model 310. In some embodiments, these agents may exist in the course content file server 112 and may be loaded to a browser when the content files are requested from the LMS browser. These agents may then be executed in the browser and may send consumption data to the server 112. The second phase includes inputting the collected data, translated into parameters as needed, into the machine learning model 310, and executing the machine learning algorithm 305 to generate analysis, predictions, and recommendations for the most effective content or content components, based on the collected dataset. The disclosed embodiments may then output a report (e.g., displayed on a GUI) including the results and tools to evaluate and predict results based on the data collected, and select a most effective content structure (e.g., templates).

As noted above, software modules comprising course content usage agents 300 may be included within, or associated with pages or other elements of the course content, thereby overcoming the lack in the prior art of an ability to track usage patterns in order to determine the learning effectiveness of pages, page elements, topics, and/or courses within a learning course. These agents may be stored in association with file content stored within the course content file server 112, and when the LMS loads in the browser, those agents are loaded into the browser. These course content usage agents 300 may monitor user activity, generate data from user activity and assessments (e.g., CYU pages), and transmit this data to server 112 for analysis. Specifically, server 112 may analyze the data to determine the effectiveness of the content structure of each page, page element, topic, learning course, and so on. In some distributed server embodiments, server(s) 112 may include one or more hosting file servers, which, in some embodiments, may be separate from one or more data collecting servers.

In some embodiments, and as a non-limiting example, each course content usage agent 300 may comprise one or more JavaScript files associated with one or more dynamic HTML pages that make up the LP pages in the topic and/or the learning course. These JavaScript agents may execute software instructions to identify, gather, track, and organize user behavior and performance data, and transmit the aggregated data to server 112 for analysis.

The software instructions within each course content usage agent 300 may be configured to evaluate the course content structure in the context of one or more user behaviors. In some embodiments, course usage data may include: 1. Check Your Understanding (CYU), which may be tracked and used to help students understand their current level of understanding of the course usage; and 2.Time spent with user interactions with a particular LP page (or LP page elements within that LP page), which may indicate an amount of interaction between the learner and the course content.

The course content usage agent 300 may therefore collect, track, analyze, and/or transmit to server 112, grade or score information (e.g., CYU scores associated with a specific course content page and/or element), as an assessment of a learner's performance for a topic/module, or as an average across a learning course. Likewise, the course content usage agent 300 may further collect, track, analyze, and/or transmit to the server, the amount of time that a user spends on an LP page (and/or its individual components, such as text, images, links, etc.).

As the purpose of the disclosed embodiments is to determine, for a particular course content structure and/or component, whether the prediction algorithm will identify that component as an effective element for learner success, each component or element may be associated with an identifier (id—e.g., a course id, lesson id, template id, a template element id, etc.). While collecting, tracking, analyzing, and transmitting data, the course content usage agent 300 may therefore also identify associated ids for each component or element, identifiers.

For example, the course content usage agent 300 may be configured to recognize a learning course id associated with any elements within the course content structure, and any associated characteristics described below may also be associated with the learning course id. Similarly, the course content usage agent 300 may be configured to recognize a lesson id for a lesson within the learning course, associated with any elements of the lesson. The characteristics described below may therefore likewise be associated with the lesson id. The course content usage agent 300 may also be configured to recognize a template id for a template within the learning course. The characteristics described below may likewise be associated with the template id.

Thus, the course content usage agent 300 may capture the following data in the workflow from the student LMS. For the time capturing workflow, the course content usage agent 300 may capture: 1. An LP Page id; 2 a timestamp indicating when the LP page is loaded; and 3. A timestamp indicating when the LP page is unloaded. For the CYU questions workflow, the course content usage agent 300 may capture the following data: 1. An LP Page id; and 2. The answer to a CYU question provided by the user.

Figure 4:
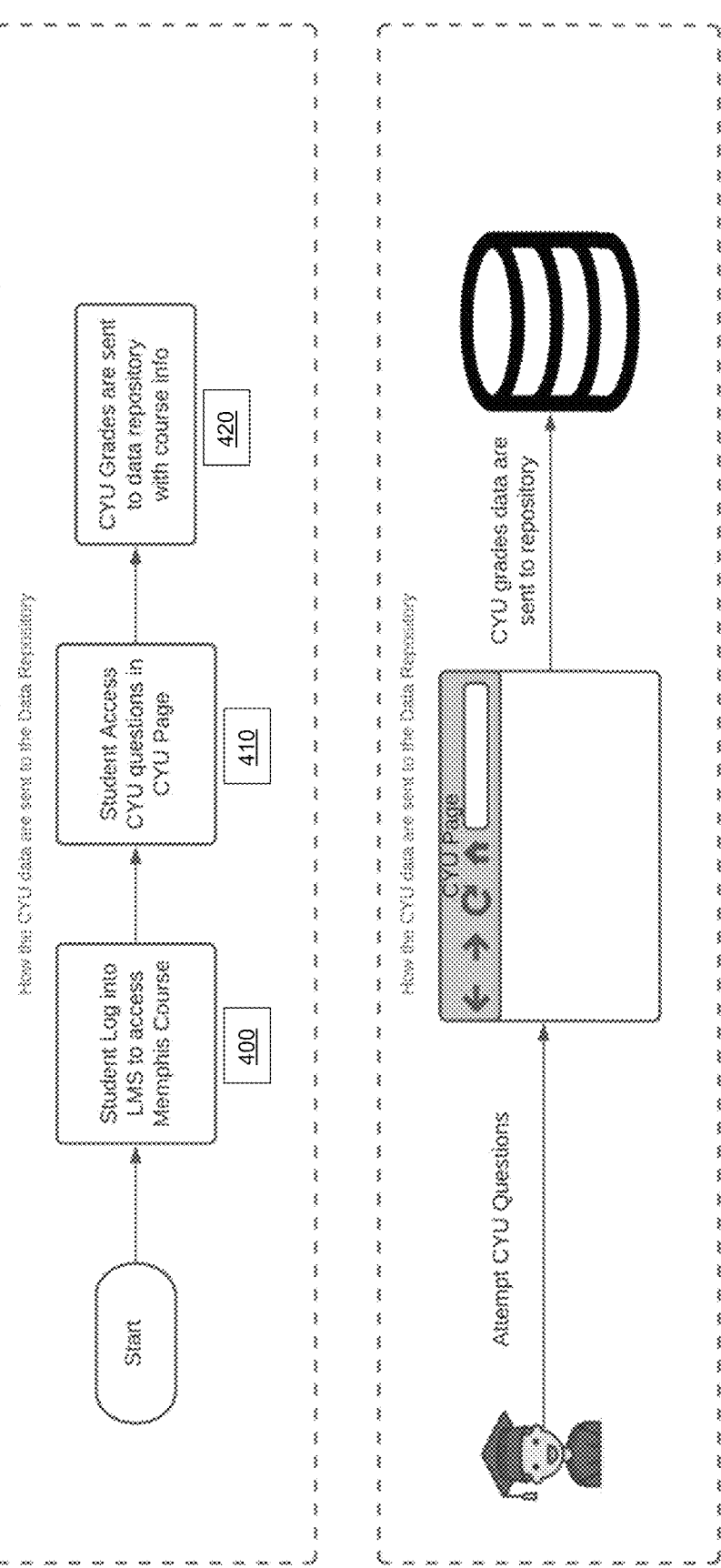
FIG. 4 illustrates a flow diagram including process steps for capturing and storing user assessment data associated with a course content data.

Turning now to FIG. 4, a flow diagram of steps to determine CYU scores and store the CYU score data and associated identifier data is demonstrated. In step 400, a user may log into the LMS to access the learning course. In step 410, the user may access the CYU questions in the CYU page, and attempt to answer them. In step 420, the CYU grades are sent to a data repository in association with the associated identifiers.

Figure 5:
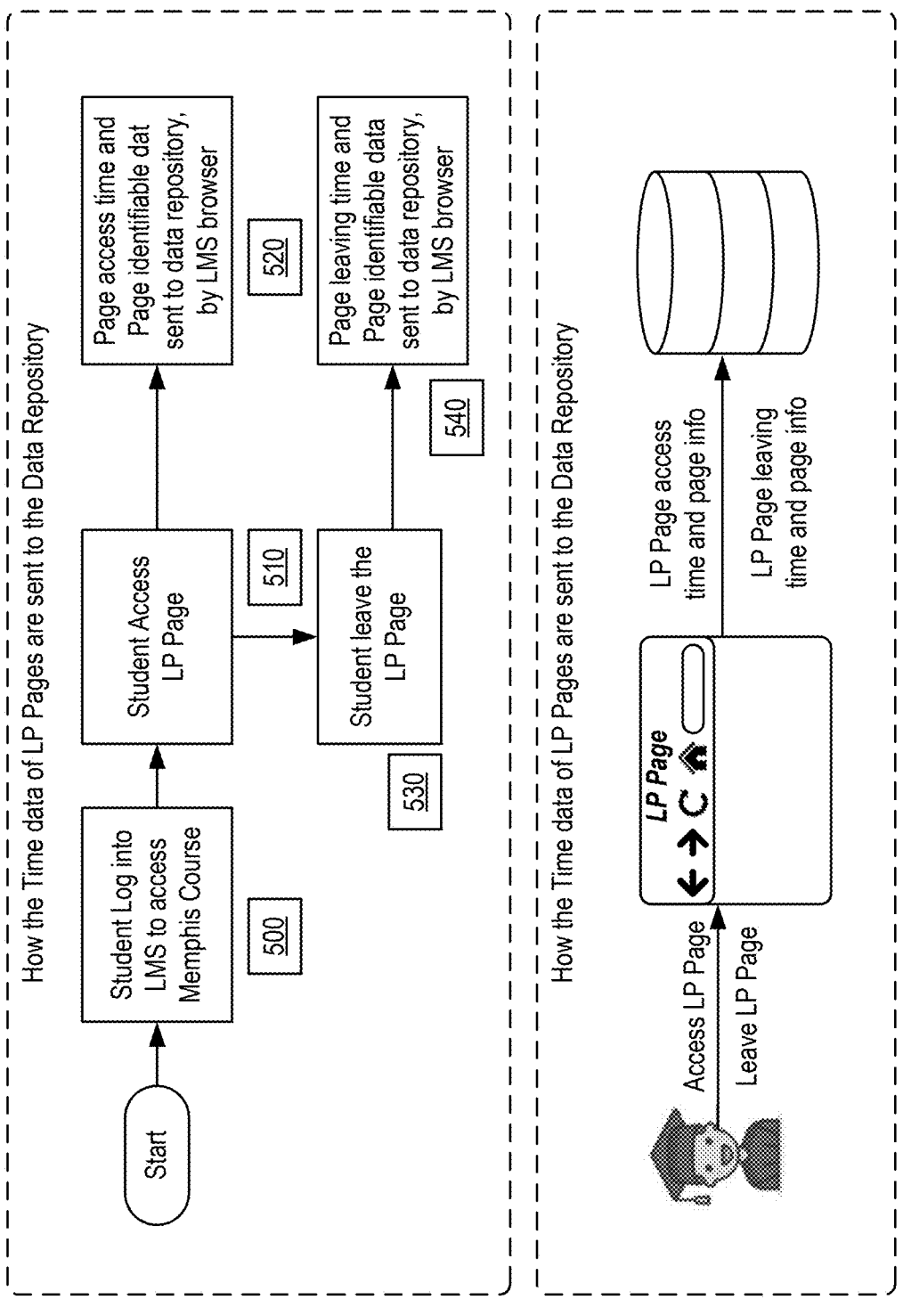
FIG. 5 illustrates a flow diagram including process steps for capturing and storing user usage time data associated with a course content data.

Turning now to FIG. 5, a flow diagram of steps to determine user interaction times and store the user interaction time data and associated identifier data is demonstrated. In step 500, a user may log into the LMS to access the learning course. In step 510, the user may access a particular LP page within the learning course. In step 520, the page access time and page identifier data may be sent to a data repository by the LMS browser. In step 530, the user may leave the LP page, and in step 540, the time that the user left the LP page and the page identifier data may be sent to the data repository by the LMS browser.

The course content usage agent 300 may further analyze the course content layout information. As a non-limiting example, the agent may analyze the details available from the course authoring tool regarding specific content page information available from pages created using the available templates.

The course content usage agent 300 may then identify, within its associated page, page element, topic, and/or course, one or more granular elements or components that define the user behavior and/or performance of an individual LP or CYU page. As above, the course content usage agent 300 for the page for each of these elements may collect, analyze, and/or transmit data about these elements to server 112, which may convert the characteristics into features, features sets, feature vectors, and/or parameters to be input into a machine learning model 310 for execution of a machine learning algorithm 305 to identify the most effective predicted course content structures.

Non-limiting examples of additional elements within the LP page (also referred to as supportive supplemental link types) may include images, video, Uniform Resource Locators (URLs), simulations, text documents, and internal URLs. Characteristics for additional elements may include text length, image area, external supplemental added factor, external images, external links, external videos, external URLs, and external text documents.

For example, the agent may identify one or more text length characteristics, which may identify an amount and/or length of blocks of text (i.e., the size of the textual content) within each of one or more individual elements of an LP or content for a learning course. The agent may further identify an associated course, lesson, template, learning page, structure component, etc. In some embodiments, the agent may further identify an amount of time that a user spends interacting with the element(s), as described above. The agent may then transmit the text length characteristic(s), associated identifiers, and/or interaction times to the server 112.

The agent may also identify one or more image area characteristics, which may identify an image area for images (i.e., the width and the height of the area of the images, possibly in pixels, defining the pixel space used by the images) within each of one or more individual elements of an LP page or other content for a learning course. If there are multiple images, the image area data for all or a combination of the images within a particular page may be used to determine the image area. The agent may further identify an associated course, lesson, template, learning page, structure component, etc. In some embodiments, the agent may further identify an amount of time that a user spends interacting with the element(s). The agent may then transmit the image area characteristic(s), associated identifiers, and/or interaction times to the server 112.

The agent may also identify one or more external supplemented added factors characteristics, which may identify external added factors (e.g., external course materials) within each of one or more individual elements of an LP page or content for a learning course. The agent may further identify an associated course, lesson, template, learning page, structure component, etc. In some embodiments, the agent may further identify an amount of time that a user spends interacting with the element(s). The agent may then transmit the external supplemented added factor characteristic(s), associated identifiers, and/or interaction times to the server 112.

The agent may also identify one or more external image characteristics, which may identify external images, or a number of external images within each of one or more individual elements of an LP page or content for a learning course. The agent may further identify an associated course, lesson, template, learning page, structure component, etc. In some embodiments, the agent may further identify an amount of time that a user spends interacting with the element(s). The agent may then transmit the external image characteristic(s), associated identifiers, and/or interaction times to the server 112.

The agent may also identify one or more external link characteristics, which may identify one or more external links and/or a number of external links that a user interacts with (e.g., use or views), within each of one or more individual elements of an LP page or content for a learning course. The agent may further identify an associated course, lesson, template, learning page, structure component, etc. In some embodiments, the agent may further identify an amount of time that a user spends interacting with the element(s). The agent may then transmit the external link characteristic(s), associated identifiers, and/or interaction times to the server 112.

The agent may also identify one or more external video characteristics, which may identify one or more external videos and/or a number of external videos that a user interacts with (e.g., use or views), within each of one or more individual elements of an LP page or content for a learning course. The agent may further identify an associated course, lesson, template, learning page, structure component, etc. In some embodiments, the agent may further identify an amount of time that a user spends interacting with the element(s). The agent may then transmit the external video characteristic(s), associated identifiers, and/or interaction times to the server 112.

The agent may also identify one or more Uniform Resource Locator (URL) characteristics, which may identify one or more external URLs and/or a number of external URLs that a user interacts with, within each of one or more individual elements of an LP page or content for a learning course. The agent may further identify an associated course, lesson, template, learning page, structure component, etc. In some embodiments, the agent may further identify an amount of time that a user spends interacting with the element(s). The agent may then transmit the external URL characteristic(s), associated identifiers, and/or interaction times to the server 112.

The agent may also identify one or more external textual document characteristics, which may identify one or more external textual documents and/or a number of external textual documents that a user interacts with (e.g., use or views), within each of one or more individual elements of an LP or content for a learning course. The agent may further identify an associated course, lesson, template, learning page, structure component, etc. In some embodiments, the agent may further identify an amount of time that a user spends interacting with the element(s). The agent may then transmit the external textual document characteristic(s), associated identifiers, and/or interaction times to the server 112.

Once the course content usage agent 300 has aggregated all information (e.g., CYU grades, interaction time, data from individual LP pages or associated elements, etc.), the agent may be configured to transmit the aggregated data to the server 112 for analysis.

Server 112 may receive the data from one or more course content usage agents 300 and perform analysis of the data with the support of predictive analysis associated with components associated with the data. As a non-limiting example, the analysis of the data received from the agents may represent a type of market research that defines the content that is most consumed and most successful (i.e., results in the highest CYU scores and usage).

To make a determination from this analysis, server may identify, analyze, and configure the data to be input as parameters into a machine learning model 310, in order to execute a machine learning algorithm 305 running on server 112. This determination and configuration may include identification and analysis of: 1. Usage patterns that emerge with the templates within specific courses, and the results of such usage, in order to observe and analyze the student behavior to identify content elements that will predict better performance for any new course that is created; and 2 Dependent and independent variables used to train the machine learning model and algorithm. In some embodiments, presenting a higher volume of data may create higher potential for identifying these usage behavior patterns, which may, in turn, provide a more clear evaluation of those content structure elements of the learning course that result in higher scores.

Non-limiting examples of such usage behavior pattern data may include: 1. Grades or scores, such as the Check Your Understanding (CYU) grades described herein; 2. Layout or other content structure information, such as the lesson presentation template details, or other content structure details available within the course authoring tool and specific content page information created by the content management systems disclosed herein; 3. Time spent by students on a course content page, or the elements of the course content page, such as a determined time spent by a student on an LP page.

Server 112 may further use the collected data from the agents to identify dependent and independent variables within the collected data. These independent and dependent variables may be used by the server to train the machine learning model in order to predict grades, such as CYU grades, when the independent variable information is derived after a content creator creates a newly created course, as described below.

Non-limiting examples of dependent and independent variables from the analyzed data may include, as non-limiting examples in some embodiments, dependent variables such as an average CYU grade for a topic, or independent variables, which may include details of course content layout such as text length, image area, time spent on the content or components of the content, details of supplemental links used etc.

Using the aggregated data, including CYU scores, user interaction times, and one or more elements associated with the course content, server 112 may convert this aggregated data into a feature set and/or feature vector in preparation for inputting this data into the machine learning model 310 in order to execute the machine learning algorithm 305. The server may then use this feature set and/or feature vector as parameters to be input into the machine learning model 310.

Server 112 may then input the parameters into the machine learning model 310 and execute the machine learning algorithm 305. In some embodiments, in order to create the predictive analytics for course content templates, the machine learning algorithm 305 may apply one or more data science regression methods to the input parameters derived from the received characteristics and features. Specifically, this input may be used to derive the relationship pattern between the independent variables and the dependent variable. In other words, the machine learning algorithm may derive the relationship between the grades and scores (the dependent variables), and course content structures, such as layout or elements, and time information (the independent variables).

Server 112 may then be configured to translate the output of the machine learning algorithm 305 as results, into scores associated with each element of the course content. For example, the output of the machine learning algorithm 305 may provide scores and/or predictive analytics. These scores may be associated with a set of templates. The disclosed system may average and predict CYU grades for a topic that includes several LP pages. Server 112 may then store the results of this output within data storage 110.

Once the predictive analytic data is stored within database 110, a user, possibly a learning course instructor, may then access and authenticate to the disclosed system. In response to the instructor user's authentication, server 112 may then generate a GUI for accessing an administration program within the course authoring tool, allowing the instructor user to access the stored data.

The GUI may be merged into the disclosed system, and the content creators who utilize these GUIs may see the data visualizations. Using this pattern, the disclosed system may provide the user with means to select a learning course to create, and/or training data filtrations. As instructors select set of parameters from the GUI for a specific class, server 112 may access the stored data resulting from the output of the machine learning algorithm for that learning course and/or its components, and may run the algorithms to generate the output, based on the received data, user behavior pattern data, and/or dependent and independent variable data received as input, aggregated, and stored. The machine learning algorithm 305 may then use existing data for that course as a test data set to generate predictive analytics for the selected course.

The output of the machine learning algorithm 305 may further include one or more predictions for grades for the newly created course. Specifically, server may utilize the output of the machine learning model/algorithm to predict grades, such as CYU grades, based on the independent variable information derived for a newly created course. In other words, the disclosed embodiments may predict expected average CYU grades or other scores for various templates or template elements within the selected and newly created learning course.

Using this data, server 112 may update the GUI to display the results of the predictive calculations for each of the available content structures for the selected and created course. As a non-limiting example, the This GUI may include results and a report of the predicted analytics for all available templates/layouts or other course structure available to the course content creator including details about how the students perform against the course content created, on average, in an informative manner. The report further provides a means for the course content creator to predict grades (e.g., CYU grades) based on the independent variable information derived for the newly created course. In some embodiments, the display described above may include a UI widget used to view available recommendations for improving the newly created course and course content.

The report may also include details such as: time spent on pages, time spent with individual elements, ways that the course or course content may be improved, low predictions and the reason that they are low, weekly behavior, how to improve templates (e.g., what elements work best, which templates, etc.) etc. This report/display including the machine learning results may allow the course content creator identify, at an early stage, the best layout or structure of the content, and/or media types to use along with the subject or course domain, as well as any bad content designs, as a preventative measure, thereby avoiding the need to rectify bad content designs later on. This will result higher grades for learners, and increase the trust on the course materials.

Figure 6:
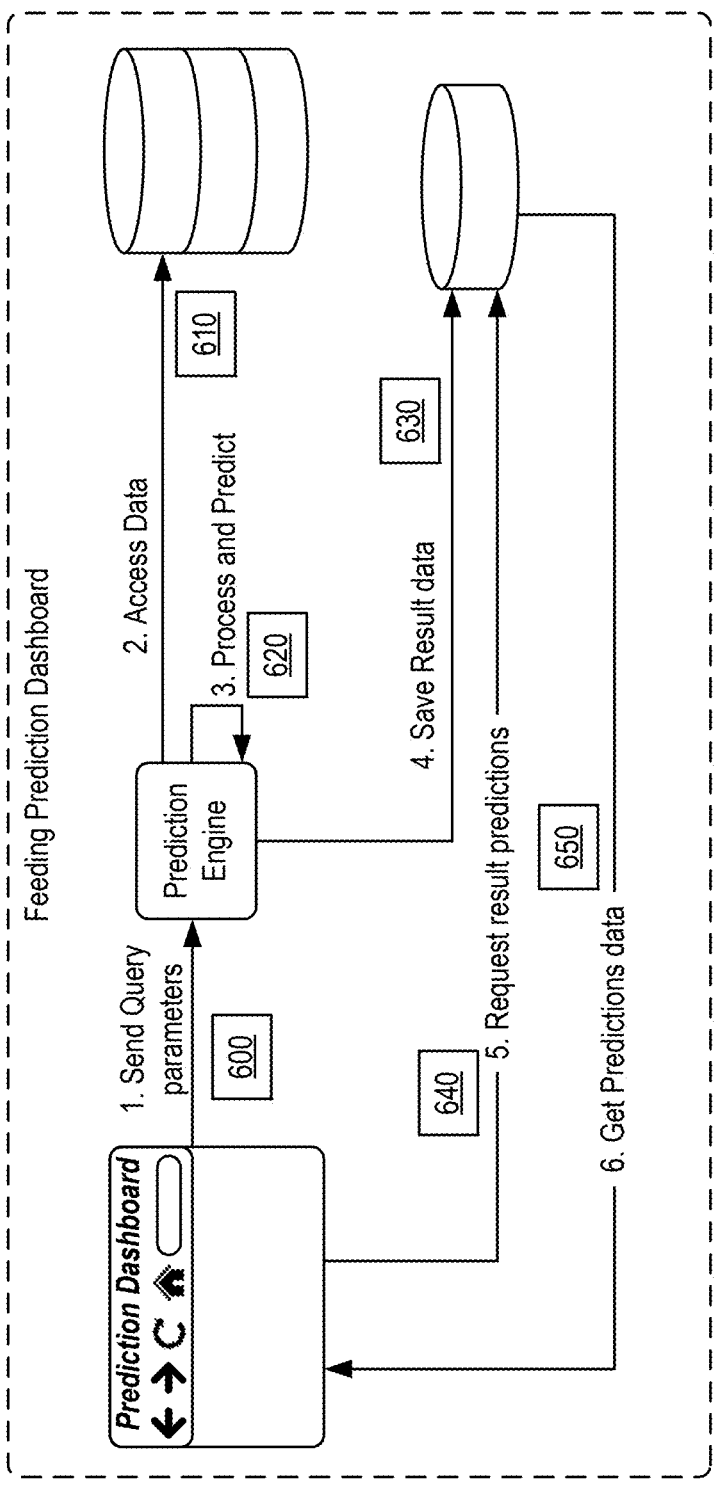
FIG. 6 illustrates a flow diagram including process steps for generating, from a machine learning output, reports, predictions, and/or recommendations for improving user performance for the course content.

Turning now to FIG. 6, a non-limiting example of this process is demonstrated. In step 600, the GUI may transmit query parameters (e.g., the identified characteristics within the course content data) to the prediction engine (e.g., the machine learning algorithm 305 and/or the machine learning model 310). In step 610, the machine learning algorithm may access data within the database 110 (e.g., the machine learning model 310 stored in the database 110, or any relevant course content data stored in the database). In step 620, the prediction engine may process all of the received data, or a filtered set of data based on the query parameters sent from the GUI according to the user preference (e.g., the received course content elements, the converted data to feature sets/arrays, the course content data from the database or the machine learning model 310), and generate predictions of the effectiveness of each element within the course content. In step 630, the prediction engine may store the results of this processing and prediction in the database 110. In step 640, a prediction dashboard (e.g., the GUI referenced above) may make a request for the results data from the prediction engine. In step 650, the prediction data may be selected from the database and transmitted to the client device for display on the prediction dashboard.

Figure 7:
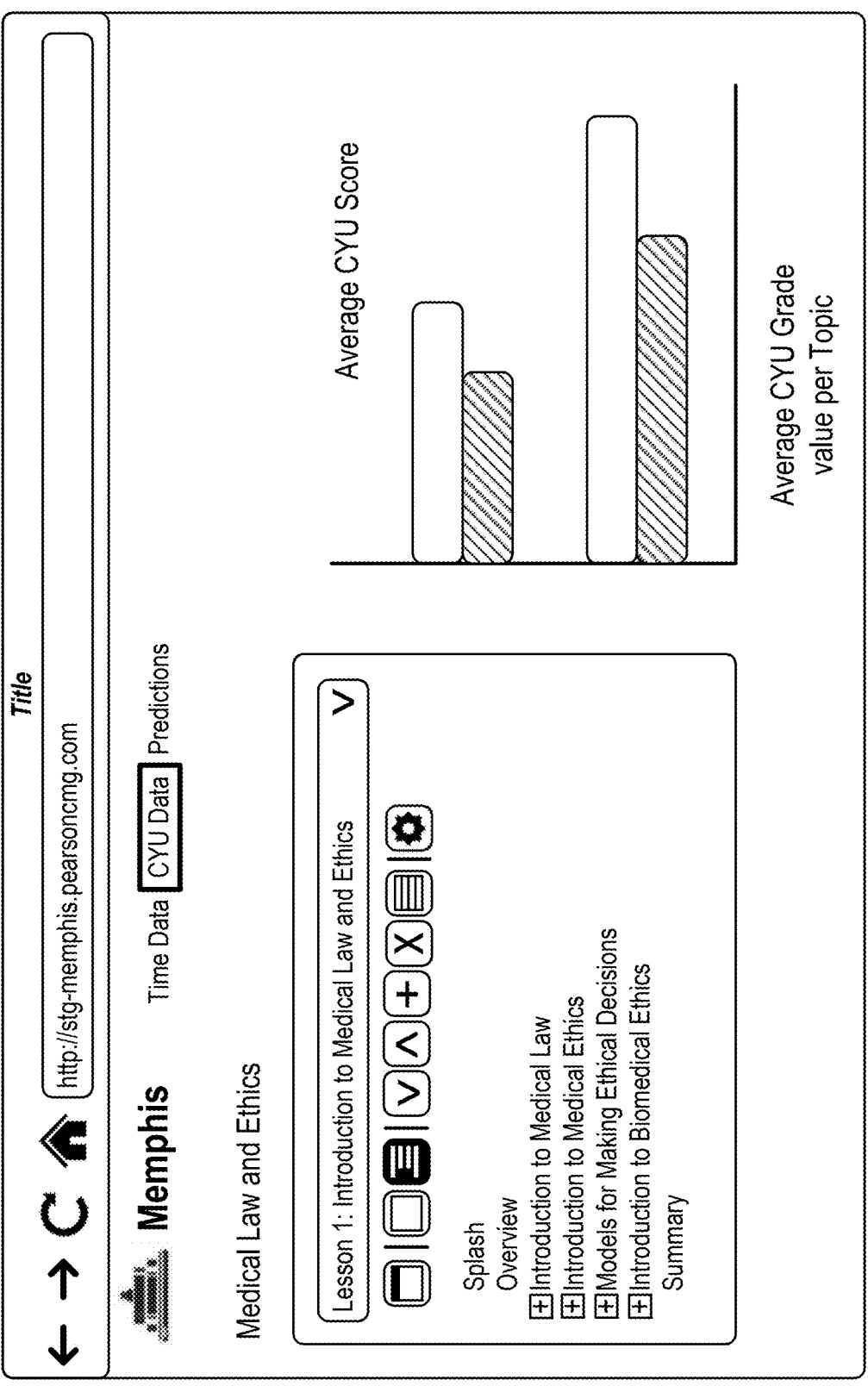
FIG. 7 illustrates a non-limiting example user interface for displaying user assessment data associated with a course content data.
Figure 8:
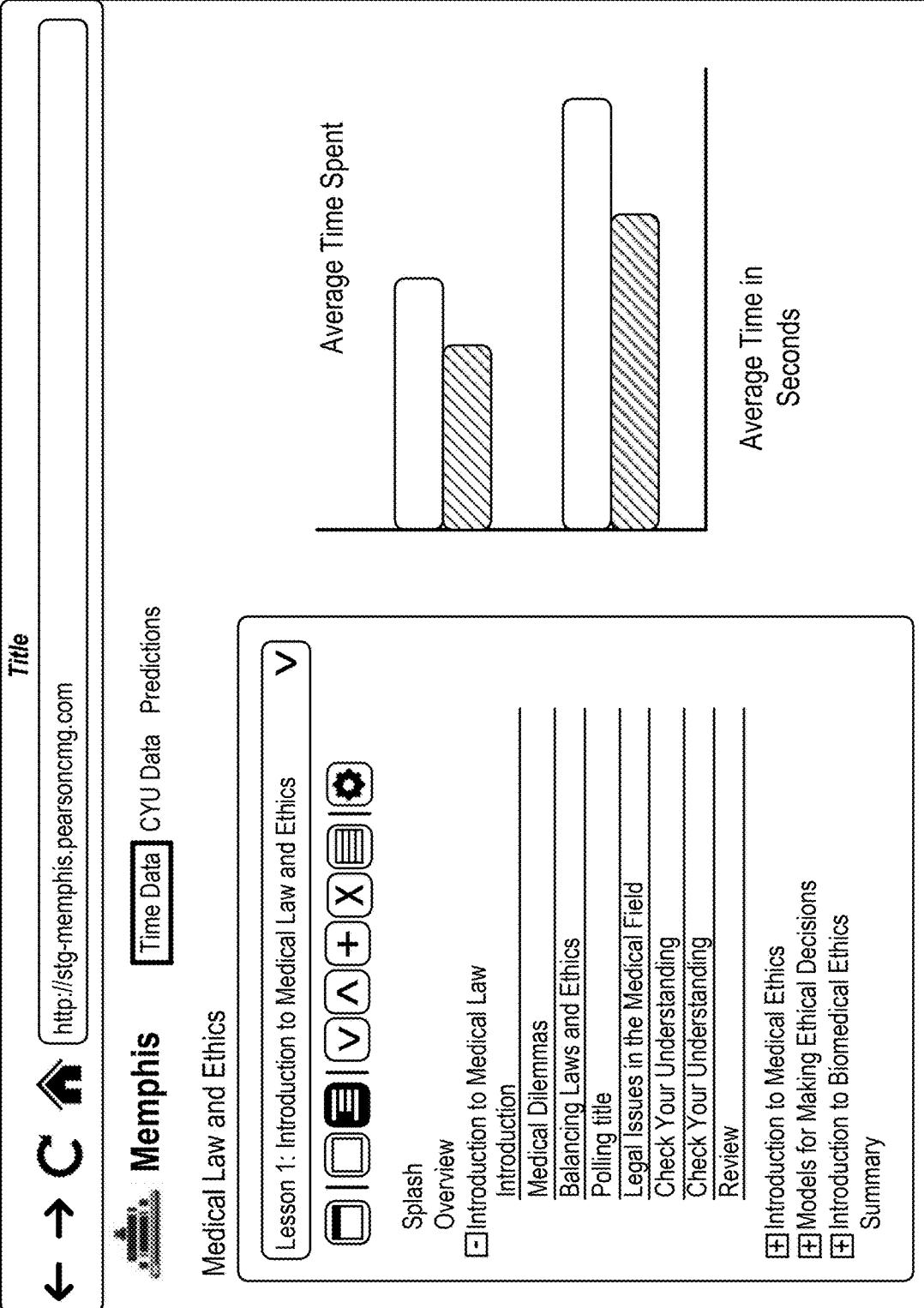
FIG. 8 illustrates a non-limiting example user interface for displaying user usage time data associated with a course content data.
Figure 9:
FIG. 9 illustrates a non-limiting example user interface for displaying reports, predictions, and/or recommendations for improving user performance for the course content.

Turning now to FIGS. 7-9, different displayed data from this process is demonstrated. For example, FIG. 7 demonstrates a non-limiting example display of the CYU data resulting from the process steps above. FIG. 8 demonstrates a non-limiting example display of the content time usage data resulting from the process steps above. FIG. 9 demonstrates a non-limiting example display of the prediction data resulting from the process steps above.

Non-limiting examples of use cases for this scenario are as follows: 1. A course content creator may want to know the predicted grades for the course he/she created. The disclosed embodiments may predict the CYU scores; 2. A course content creator may see the recommendations on course content structure/layout in order to get higher grades.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:
1. A system comprising:
a database coupled to a network and storing:
  a course content;
  a course content activity agent stored in association with the course content, wherein the course content activity agent includes software instructions to monitor user activity related to the course content;
  a content structure data related to a manner of presentation of the course content; and
  a machine learning model configured to generate a recommendation for an update to the course content based on an input feature set;
a first client device coupled to the network and configured to, responsive to a request for the course content, (a) access the course content and the course content activity agent and (b) execute the software instructions of the course content activity agent to identify, in association with the course content, a content usage data related to user interaction with the course content, the content usage data comprising:
  an assessment score; and
  a user interaction time data;
a server comprising at least one computing device coupled to the network and comprising at least one processor executing instructions within memory which, when executed, cause the system to:

receive, through the network from the course content activity agent, the content usage data;

receive, through the network, the content structure data;

convert the content usage data and the content structure data into a feature set for the machine learning model;

input the feature set into the machine learning model as the input feature set; and generate, using an output from the machine learning model, a graphical user interface (GUI), transmitted through the network and displayed on a second client device, comprising:

a report of the output;

the recommendation for the update to the course content, the recommendation including an identification of portions of the course content or of the content structure data that affect the assessment score; and a prediction, in response to the update, of an increase to an average assessment score associated with the course content.

2. The system of claim 1, wherein the course content activity agent includes a JavaScript file, executed in association with an HTML page comprising the course content.

3. The system of claim 1, wherein the instructions, when executed, further cause the system to:

identify, in association with the course content a plurality of course content element data including at least one of: a text length, an image area, an external supplemented added factor, an external image, a number of external images, an external link, a number of external links, an external video, a number of external videos, an external Uniform Resource Locator (URL), a number of URLs, an external textual document, or a number of external textual documents.

4. The system of claim 1, wherein the instructions, when executed, further cause the system to associate each element of the course content with an identification selected from at least one of: a course identification, a page identification, a lesson identification, a template identification, or a course content element identification.

5. The system of claim 1, wherein the instructions, when executed, further cause the system to determine the user interaction time data according to a load time of a lesson presentation page and an unload time of the lesson presentation page.

6. The system of claim 1, wherein the instructions, when executed, further cause the system to analyze and make determinations from the content usage data received according to:

at least one content usage pattern within the content usage data; and at least one dependent variable identified within the content usage data compared to at least one independent variable identified within the content usage data.

7. The system of claim 1, wherein the feature set includes a plurality of feature vectors.

8. The system of claim 1, wherein the report of the output includes a prediction of an increase to an average assessment score corresponding to each of a plurality of portions of the course content or of the content structure data.

9. A method comprising:

storing, by a server comprising at least one computing device coupled to a network and comprising at least one processor executing instructions within memory, within a database coupled to the network:

a course content;

a course content activity agent stored in association with the course content, wherein the course content activity agent includes software instructions to monitor user activity related to the course content;

a content structure data related to a manner of presentation of the course content; and a machine learning model configured to generate a recommendation for an update to the course content based on an input feature set;

receiving, by the server, through the network from a first client device, a request for the course content;

responsive to the request, providing, by the server, through the network to the first client device, the course content and the course content activity agent, wherein the first client device executes the software instructions of the course content activity agent while providing the course content to a user of the first client device;

receiving, by the server, through the network from the course content activity agent executing on the first client device, a content usage data relating to user interaction with the course content, identified in association with the course content, the content usage data comprising:

an assessment score; and a user interaction time data;

receiving, by the server, through the network, the content structure data;

converting, by the server, the content usage data and the content structure data into at least one feature set for the machine learning model;

inputting, by the server, the at least one feature set into the machine learning model as the input feature set; and generating, by the server using an output from the machine learning model, a graphical user interface (GUI), transmitted through the network and displayed on a second client device, comprising:

a report of the output;

the recommendation for the update to the course content, the recommendation including an identification of portions of the course content or of the content structure data that affect the assessment score; and a prediction, in response to the update, of an increase to an average assessment score associated with the course content.

10. The method of claim 9, further comprising the step of executing, at the first client device, a JavaScript file in association with an HTML page comprising the course content, the JavaScript file including the course content activity agent.

11. The method of claim 9 further comprising the step of identifying within the content structure data, by the server in association with the course content, a plurality of course content element data comprising at least one of: a text length, an image area, an external supplemented added factor, an external image or number of external images, an external link, a number of external links, an external video, a number of external videos, an external Uniform Resource Locator (URL), a number of URLs, an external textual document, or a number of external textual documents.

12. The method of claim 9, further comprising the step of associating, by the server, each element of the course content with an identification selected from the group consisting of a course identification, a page identification, a lesson identification, a template identification, or course content element identification.

13. The method of claim 9, further comprising the step of determining, by the server, the user interaction time data according to a load time of a lesson presentation page and an unload time of the lesson presentation page.

14. The method of claim 9, further comprising the steps of analyzing and making determinations, by the server, from the content usage data received according to:

at least one content usage pattern within the content usage data; and at least one dependent variable identified within the content usage data compared to at least one independent variable identified within the content usage data.

15. A system comprising a server, comprising at least one computing device coupled to a network and comprising at least one processor executing instructions within memory, the server being configured to:

store, within a database coupled to the network:

a course content;

a course content activity agent stored in association with the course content, wherein the course content activity agent includes software instructions to monitor user activity related to the course content;

a content structure data related to a manner of presentation of the course content; and a machine learning model configured to generate a recommendation for an update to the course content based on an input feature set;

receive, through the network from a first client device, a request for the course content;

responsive to the request, provide, through the network to the first client device, the course content and the course content activity agent, wherein the first client device executes the software instructions of the course content activity agent while providing the course content to a user of the first client device;

receive, through the network from the course content activity agent executing on the first client device, a content usage data relating to user interaction with the course content, identified in association with the course content, the content usage data comprising:

an assessment score; and a user interaction time data;

receive, through the network, the content structure data;

convert the content usage data and the content structure data into a set of feature vectors;

input the set of feature vectors into the machine learning model as the input feature set;

generate, using an output from the machine learning model, a graphical user interface (GUI), transmitted through the network and displayed on a second client device, comprising:

a report of the output;

the recommendation for the update to the course content, the recommendation including an identification of portions of the course content or of the content structure data that affect the assessment score; and a prediction, in response to the update, of an increase to an average assessment score associated with the course content.

16. The system of claim 15, wherein the server is further configured to execute, at the first client device, a JavaScript file in association with an HTML page providing the course content, the JavaScript file including the course content activity agent.

17. The system of claim 15, wherein the server is further configured to identify within the content structure data, in association with the course content, a plurality of course content element data comprising at least one of: a text length, an image area, an external supplemented added factor, an external image, a number of external images, an external link, a number of external links, an external video, a number of external videos, an external Uniform Resource Locator (URL), a number of URLs, an external textual document, or a number of external textual documents.

18. The system of claim 15, wherein the server is further configured to associate each element of the course content with an identification selected from the group consisting of a course identification, a page identification, a lesson identification, a template identification, or course content element identification.

19. The system of claim 15, wherein the server is further configured to determine the user interaction time data according to a load time of a lesson presentation page and an unload time of the lesson presentation page.

20. The system of claim 15, wherein the server is further configured to analyze and make determinations from the content usage data received according to:

at least one content usage pattern within the content usage data; and at least one dependent variable identified within the content usage data compared to at least one independent variable identified within the content usage data.

\* \* \* \* \*